(12) United States Patent
Jiang et al.

(10) Patent No.: US 7,257,695 B2
(45) Date of Patent: Aug. 14, 2007

(54) REGISTER FILE REGIONS FOR A PROCESSING SYSTEM

(75) Inventors: Hong Jiang, San Jose, CA (US); Val Cook, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 296 days.

(21) Appl. No.: 11/024,298

(22) Filed: Dec. 28, 2004

(65) Prior Publication Data
US 2006/0149937 A1    Jul. 6, 2006

(51) Int. Cl.
*G06F 7/76* (2006.01)
(52) U.S. Cl. ................. 712/22; 712/2; 712/7
(58) Field of Classification Search ........... 712/22, 712/2, 7
See application file for complete search history.

(56) References Cited

U.S. PATENT DOCUMENTS 5,513,366 A * 4/1996 Agarwal et al. ............. 712/22
5,812,147 A * 9/1998 Van Hook et al. .......... 345/537
6,175,892 B1   1/2001 Sazzad et al.
2002/0010847 A1  1/2002 Abdallah et al.
2002/0026570 A1  2/2002 Shimizu et al.
2005/0108503 A1 * 5/2005 Sandon et al. ................ 712/4

OTHER PUBLICATIONS

"PCT International Search Report of the International Searching Authority", mailed Jun. 20, 2006, for PCT/US2005/047279, 4pgs.

* cited by examiner

*Primary Examiner*—Donald Sparks
*Assistant Examiner*—Vincent Lai
(74) *Attorney, Agent, or Firm*—Alan Pedersen-Giles

(57) ABSTRACT

According to some embodiments, a dynamic region in a register file may be described for an operand. The described region may, for example, store multiple data elements, each data element being associated with an execution channel of an execution engine. Information may then be stored into and/or retrieved from the register file in accordance with the described region.

24 Claims, 15 Drawing Sheets

REGISTER FILE REGIONS FOR A PROCESSING SYSTEM

BACKGROUND

To improve the performance of a processing system, a Single Instruction, Multiple Data (SIMD) instruction is simultaneously executed for multiple operands of data in a single instruction period. For example, an eight-channel SIMD execution engine might simultaneously execute an instruction for eight 32-bit operands of data, each operand being mapped to a unique compute channel of the SIMD execution engine. Moreover, one or more registers in a register file may be used by SIMD instructions, and each register may have fixed locations associated with execution channels (e.g., a number of eight-word registers could be provided for an eight-channel SIMD execution engine, each word in a register being assigned to a different execution channel). An ability to efficiently and flexibly access register information in different ways may further improve the performance of a SIMD execution engine.

DETAILED DESCRIPTION

Some embodiments described herein are associated with a "processing system." As used herein, the phrase "processing system" may refer to any device that processes data. A processing system may, for example, be associated with a graphics engine that processes graphics data and/or other types of media information. In some cases, the performance of a processing system may be improved with the use of a SIMD execution engine. For example, a SIMD execution engine might simultaneously execute a single floating point SIMD instruction for multiple channels of data (e.g., to accelerate the transformation and/or rendering three-dimensional geometric shapes). Other examples of processing systems include a Central Processing Unit (CPU) and a Digital Signal Processor (DSP).

Figure 1:
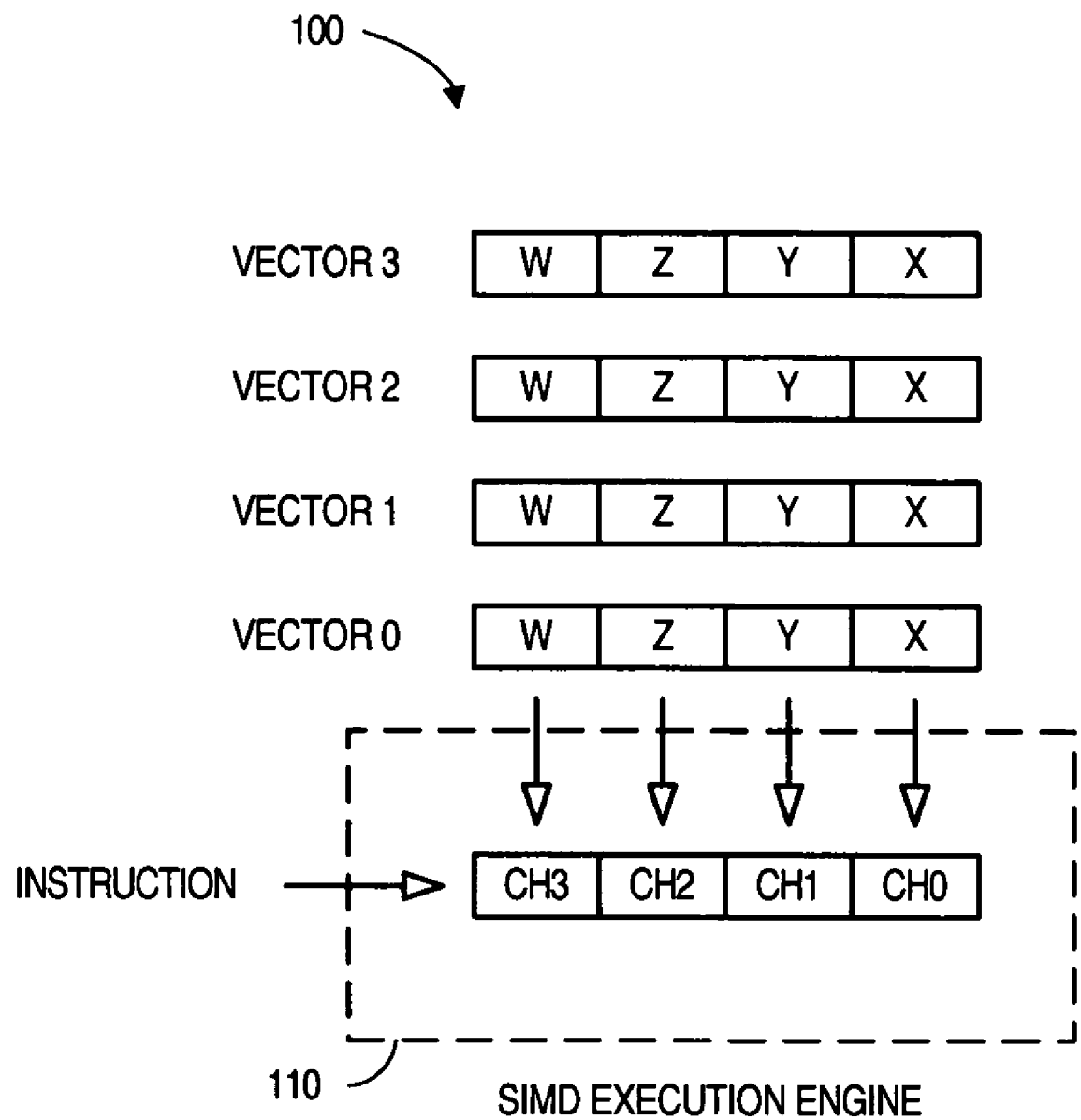
FIGS. 1 and 2 are block diagrams of processing systems.

FIG. 1 illustrates one type of processing system 100 that includes a SIMD execution engine 110. In this case, the execution engine 110 receives an instruction (e.g., from an instruction memory unit) along with a four-component data vector (e.g., vector components X, Y, Z, and W, each having bits, laid out for processing on corresponding channels 0 through 3 of the SIMD execution engine 110). The engine 110 may then simultaneously execute the instruction for all of the components in the vector. Such an approach is called a "horizontal," "channel-parallel," or "Array Of Structures (AOS)" implementation.

Figure 2:
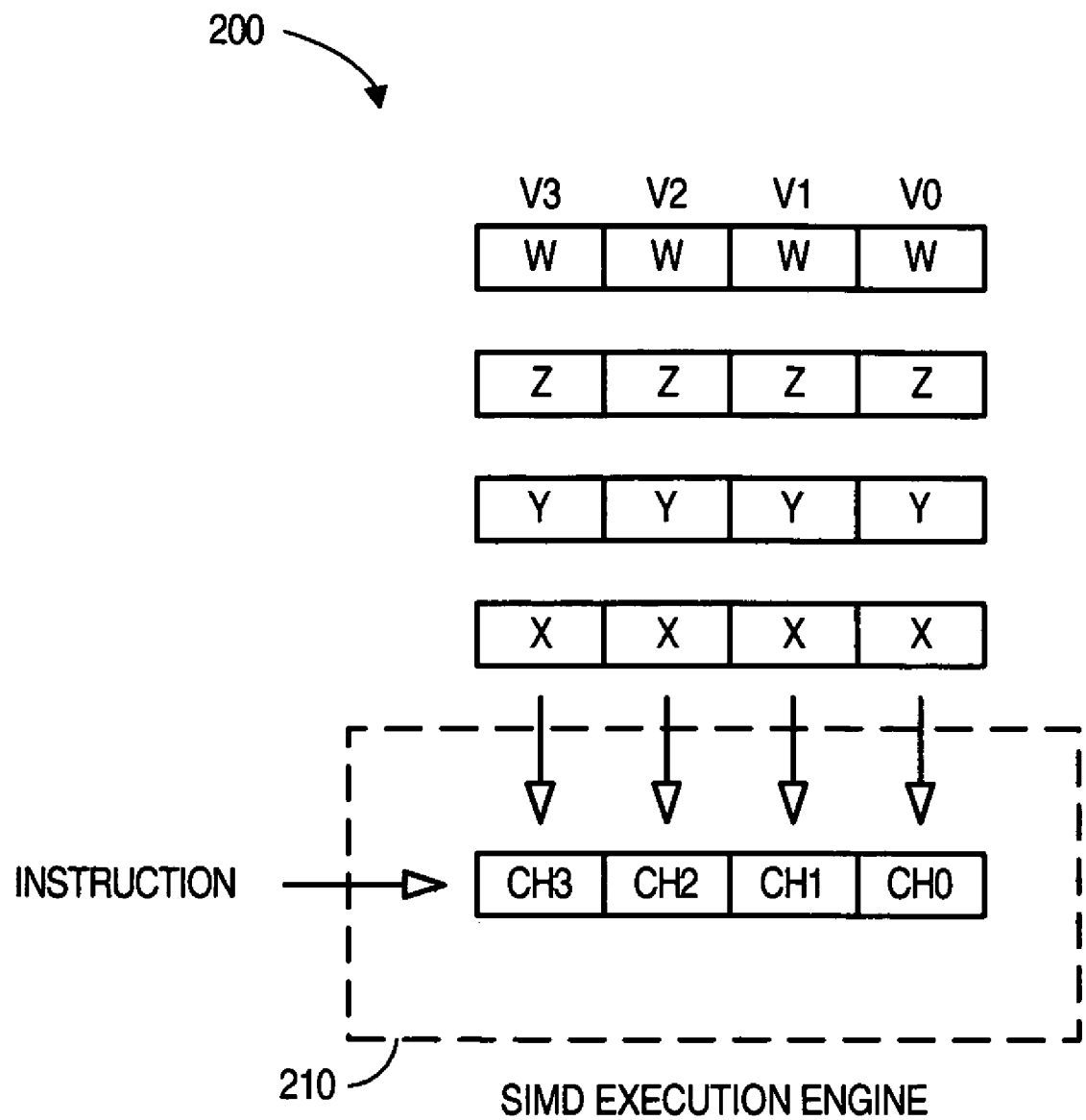

FIG. 2 illustrates another type of processing system 200 that includes a SIMD execution engine 210. In this case, the execution engine 210 receives an instruction along with four operands of data, where each operand is associated with a different vector (e.g., the four X components from vectors V0 through V3). Each vector may include, for example, three location values (e.g., X, Y, and Z) associated with a three-dimensional graphics location. The engine 210 may then simultaneously execute the instruction for all of the operands in a single instruction period. Such an approach is called a "vertical," "channel-serial," or "Structure Of Arrays (SOA)" implementation. Although some embodiments described herein are associated with a four and eight channel SIMD execution engines, note that a SIMD execution engine could have any number of channels more than one (e.g., embodiments might be associated with a thirty-two channel execution engine).

Figure 3:
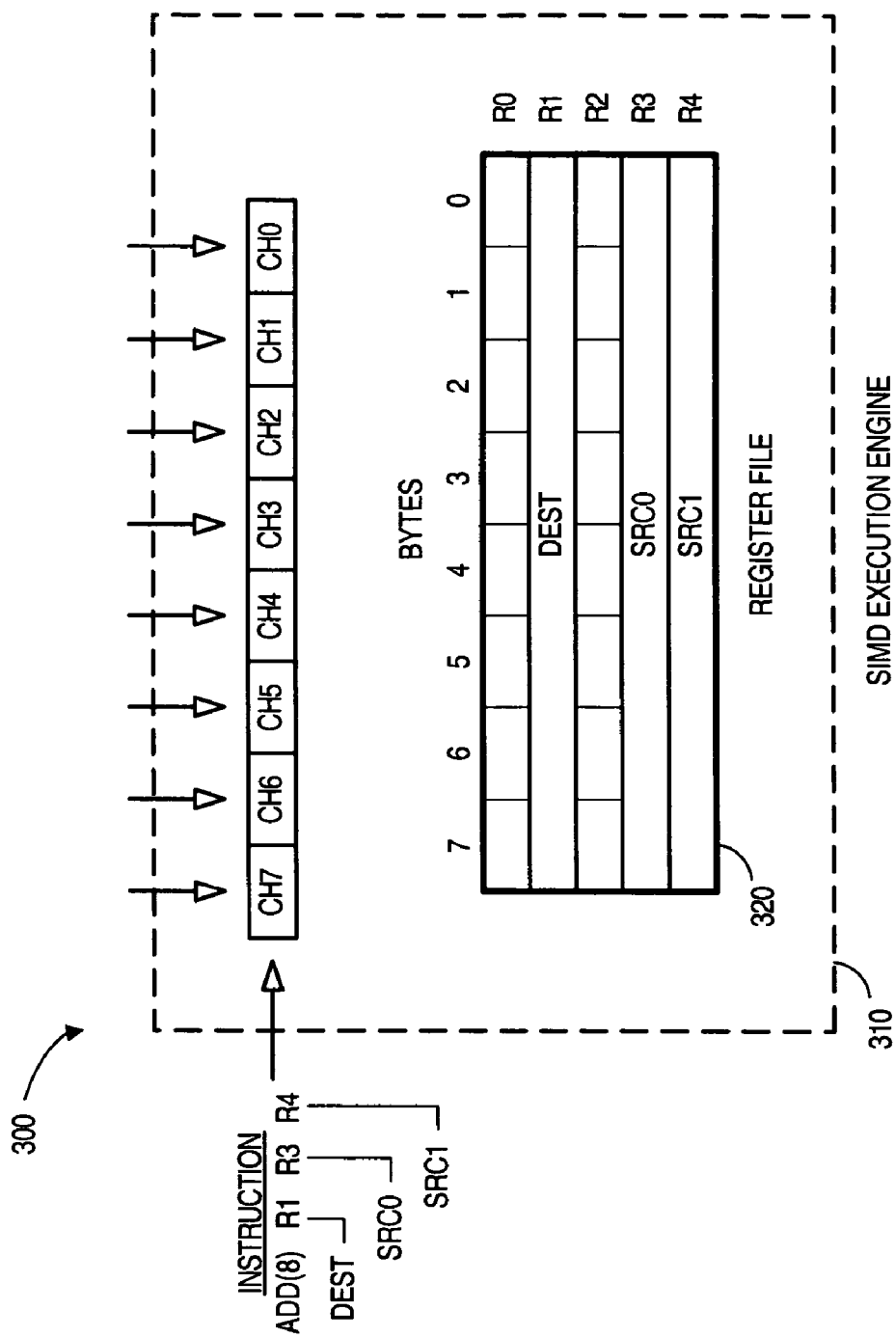
FIG. 3 illustrates an instruction and a register file for a processing system.

FIG. 3 illustrates a processing system 300 with an eight-channel SIMD execution engine 310. The execution engine 310 may include an eight-byte register file 320, such as an on-chip General Register File (GRF), that can be accessed using assembly language and/or machine code instructions. In particular, the register file 320 in FIG. 3 includes five registers (R0 through R4) and the execution engine 310 is executing the following hardware instruction:

| add(8) | R1 | R3 | R4 |
|--------|----|----|----|

The "(8)" indicates that the instruction will be executed on operands for all eight execution channels. The "R1" is a destination operand (DEST), and "R3" and "R4" are source operands (SRC0 and SRC1, respectively). Thus, each of the eight single-byte data elements in R4 will be added to corresponding data elements in R3. The eight results are then stored in R1. In particular, the first byte of R4 will be added to the first byte of R3 and that result will be stored in the first byte of R1. Similarly, the second byte of R4 will be added to the second byte of R3 and that result will be stored in the second byte of R1, etc.

In some applications, it may be helpful to access information in a register file in various ways. For example, in a graphics application it might at some times be helpful to treat portions of the register file as a vector, a scalar, and/or an array of values. Such an approach may help reduce the amount of instruction and/or data moving, packing, unpacking, and/or shuffling and improve the performance of the system.

Figure 4:
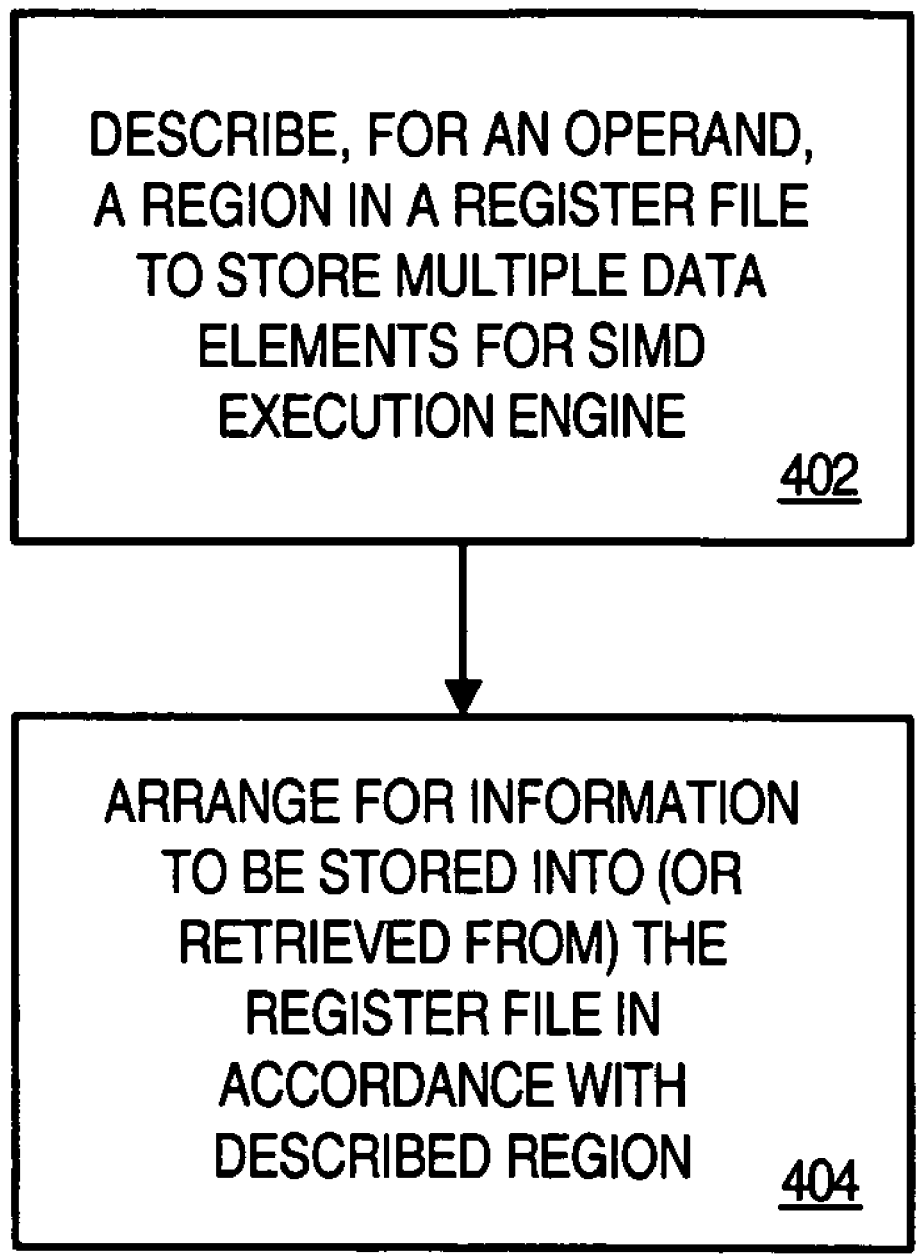
FIG. 4 is a flow chart of a method according to some embodiments.

FIG. 4 is a flow chart of a method according to some embodiments. The flow charts described herein do not necessarily imply a fixed order to the actions, and embodiments may be performed in any order that is practicable.

Note that any of the methods described herein may be performed by hardware, software (including microcode), firmware, or any combination of these approaches. For example, a hardware instruction mapping engine might be used to facilitate operation according to any of the embodiments described herein.

At 402, a region in a register file is described for an operand. The operand might be, for example, a destination or source operand of a machine code instruction to be executed by a SIMD execution engine. According to some embodiments, the described region is "dynamic" in that different regions in the register file may be defined at different times. The description of the region might be, for example, encoded in the machine code instruction. Note that more than one region in the register file might be described at one time.

At 404, it is arranged for information to be stored into (or retrieved from) the register file in accordance with the described region. For example, data from a first region might be compared to data in a second region, and a result might be stored in a third region on a per-channel basis.

Figure 5:
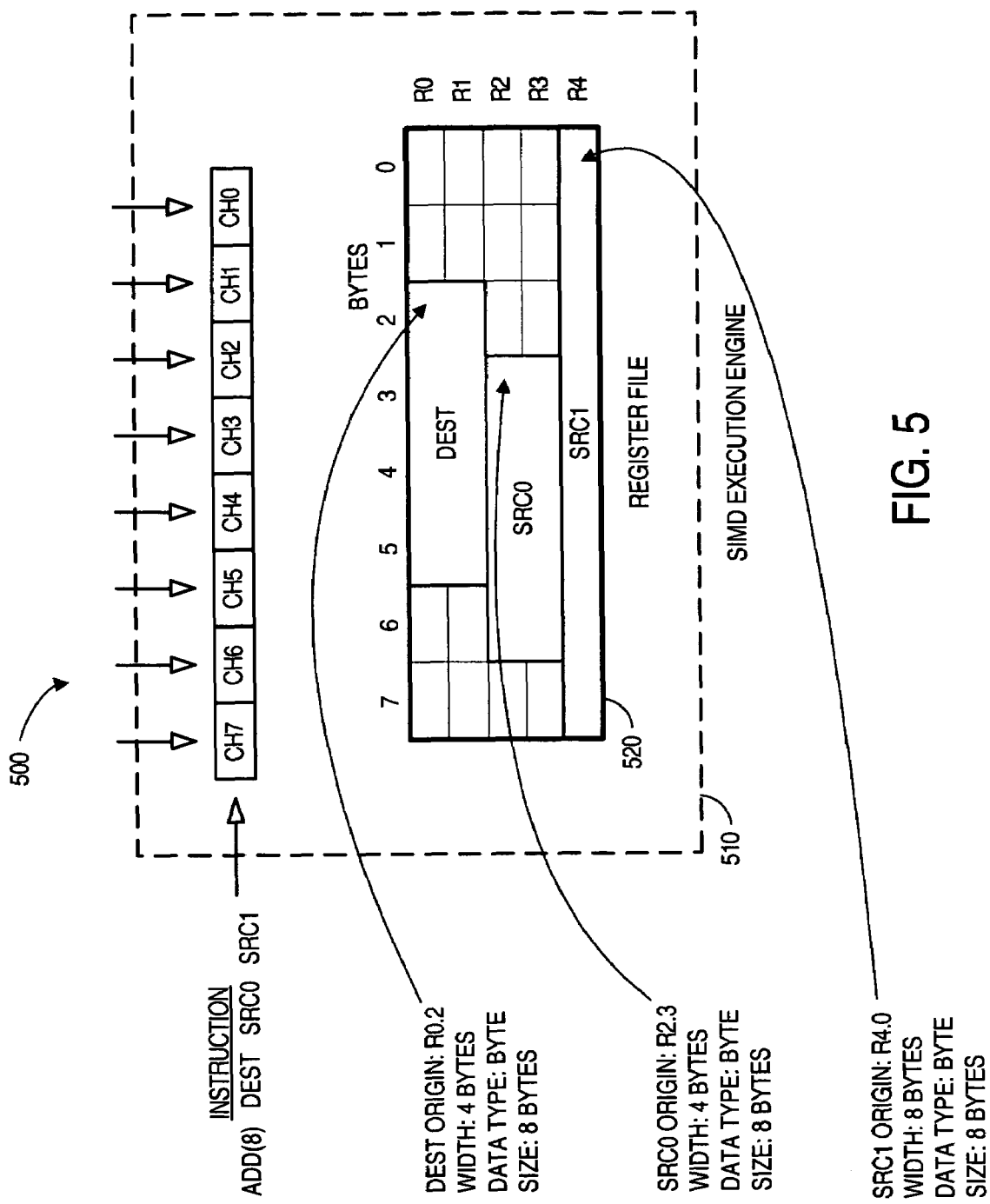
FIG. 5 illustrates an instruction and a register file for a processing system according to some embodiments.

FIG. 5 illustrates a processing system 500 with an eight-channel SIMD execution engine 510 according to some embodiments. In this example, three regions have been described for a register file 520 having five eight-byte registers (R0 through R4): a destination region (DEST) and two source regions (SRC0 and SRC1). The regions might have been defined, for example, by a machine code add instruction. Moreover, in this example all execution channels are being used and the data elements are assumed to be bytes of data (e.g., each of eight SRC1 bytes will be added to a corresponding SRC0 byte and the results will be stored in eight DEST bytes in the register file 520).

Each region description includes a register identifier and a "sub-register identifier" indicating a location of a first data element in the register file 520 (illustrated in FIG. 5 as an "origin" of RegNum.SubRegNum). The sub-register identifier might indicate, for example, an offset from the start of a register (e.g., and may be expressed using a physical number of bits or bytes or a number of data elements). For example, the DEST region in FIG. 5 has an origin of R0.2, indicating that first data element in the DEST region is located at byte two of the first register (R0). Similarly, the SRC0 region begins at byte three of R2 (R2.3) and the SCR1 region starts at the first byte of R4 (R4.0). Note that the described regions might not be aligned to the register file 520 (e.g., a region does not need to start at byte 0 and end at byte 7 of a single register).

Note that an origin might be defined in other ways. For example, the register file 520 may be considered as a contiguous 40-byte memory area. Moreover, a single 6-bit address origin could point to a byte within the register file 520. Note that a single 6-bit address origin is able to point to any byte within a register file of up to 64-byte memory area. As another example, the register file 520 might be considered as a contiguous 320-bit memory area. In this case, a single 9-bit address origin could point to a bit within the register file 520.

Each region description may further include a "width" of the region. The width might indicate, for example, a number of data elements associated with the described region within a register row. For example, the DEST region illustrated in FIG. 5 has a width of four data elements (e.g., four bytes). Since eight execution channels are being used (and, therefore eight one-byte results need to be stored), the "height" of the region is two data elements (e.g., the region will span two different registers). That is, the total number of data elements in the four-element wide, two-element high DEST region will be eight. The DEST region might be considered a two dimensional array of data elements including register rows and register columns.

Similarly, the SRC0 region is described as being four bytes wide (and therefore two rows or registers high) and the SRC1 region is described as being eight bytes wide (and therefore has a vertical height of one data element). Note that a single region may span different registers in the register file 520 (e.g., some of the DEST region illustrated in FIG. 5 is located in a portion of R0 and the rest is located in a portion of R1).

Although some embodiments discussed herein describe a width of a region, according to other embodiments a vertical height of the region is instead described (in which case the width of the region may be inferred based on the total number of data elements). Moreover, note that overlapping register regions may be defined in the register file 520 (e.g., the region defined by SRC0 might partially or completely overlap the region defined by SRC1). In addition, although some examples discussed herein have two source operands and one destination operand, other types of instructions may be used. For example, an instruction might have one source operand and one destination operand, three source operands and two destination operands, etc.

According to some embodiment, a described region origin and width might result in a region "wrapping" to the next register in the register file 520. For example, a region of byte-size data elements having an origin of R2.6 and a width of eight would include the last bytes of R2 along with the first six bytes of R3. Similarly, a region might wrap from the bottom of the register file 520 to the top (e.g., from R4 to R0).

Figure 6:
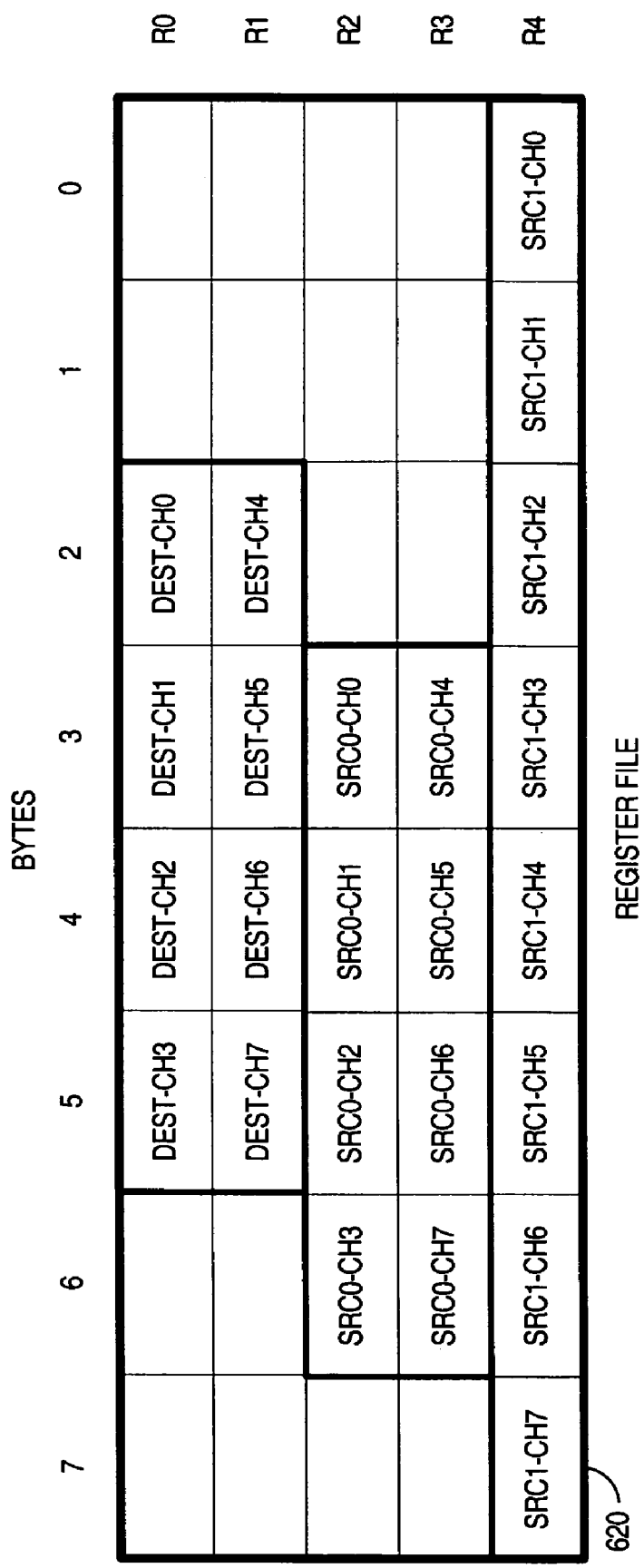
FIG. 6 illustrates execution channel mapping in a register file according to some embodiments.

The SIMD execution engine 510 may add each byte in the described SRC1 region to a corresponding byte in the described SRC0 region and store the results the described DEST region in the register file 520. For example, FIG 6 illustrates execution channel mapping in the register file 620 according to some embodiments. In this case, data elements are arranged within a described region in a row-major order. Consider, for example, channel 6 of the execution engine 510. This channel will add the value stored in byte six of R4 to the value stored in byte five of R3 and store the result in byte four of R1. According to other embodiments, data elements may arranged within a described region in a column-major order or using any other mapping technique.

Figure 7:
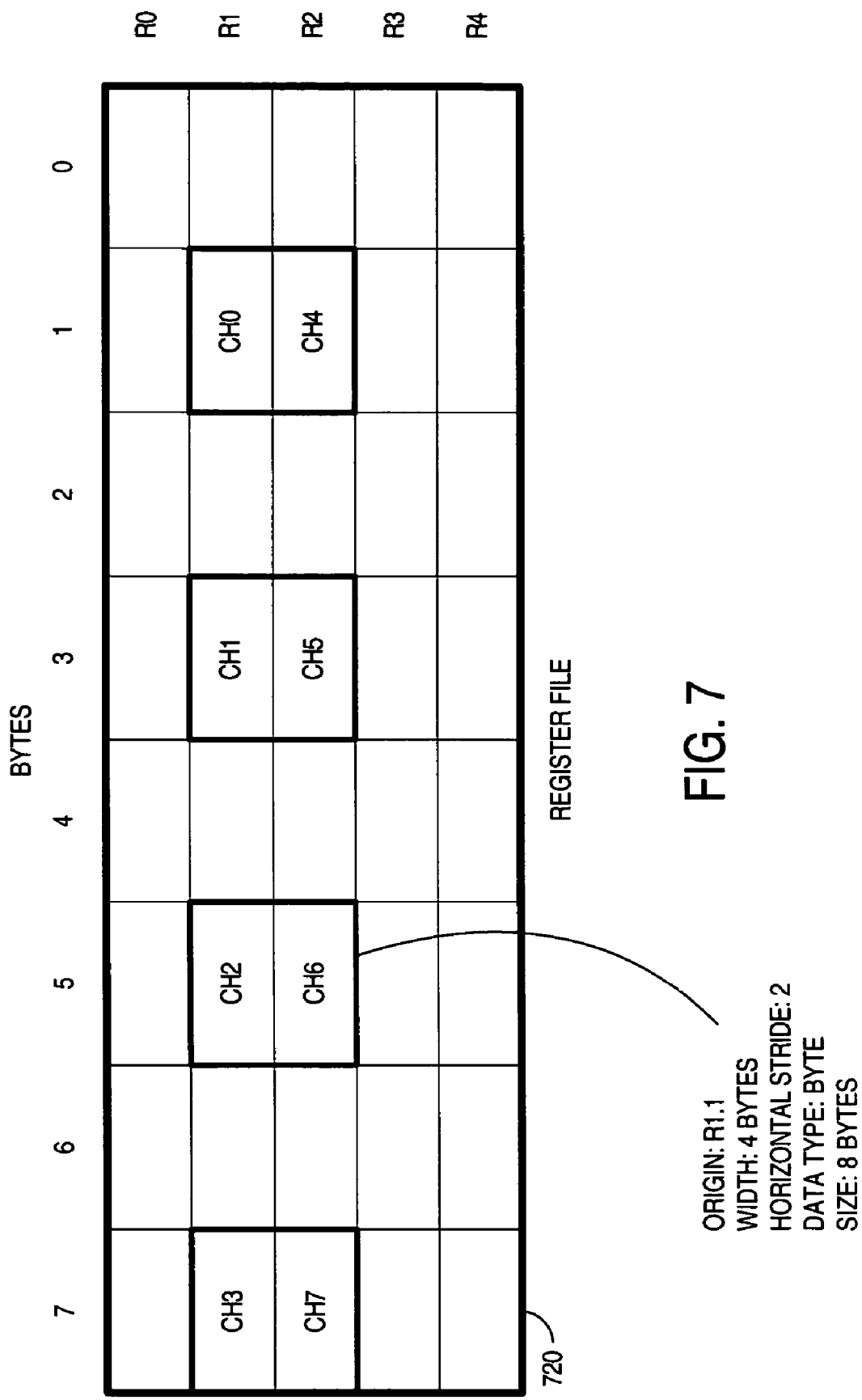
FIG. 7 illustrates a region description including a horizontal stride according to some embodiments.

FIG. 7 illustrates a region description including a "horizontal stride" according to some embodiments. The horizontal stride may, for example, indicate a column offset between columns of data elements in a register file 720. In particular, the region described in FIG. 7 is for eight single-byte data elements (e.g., the region might be appropriate when only eight channels of a sixteen-channel SIMD execution engine are being used by a machine code instruction). The region is four bytes wide, and therefore two data elements high (such that the region will include eight data elements) and beings at R1.1 (byte 1 of R1).

In this case, a horizontal stride of two has been described. As a result, each data element in a row is offset from its neighboring data element in that row by two bytes. For example, the data element associated with channel 5 of the execution engine is located at byte 3 of R2 and the data element associated with channel 6 is located at byte 5 of R2. In this way, a described region may not be contiguous in the register file 720. Note that when a horizontal stride of one is described, the result would be a contiguous 4×2 array of bytes beginning at R1.1 in the two dimensional map of the register file 720.

The region described in FIG. 7 might be associated with a source operand, in which case data may be gathered from the non-contiguous areas when an instruction is executed. The region described in FIG. 7 might also be associated with a destination operand, in which case results may be scattered to the non-contiguous areas when an instruction is executed.

Figure 8:
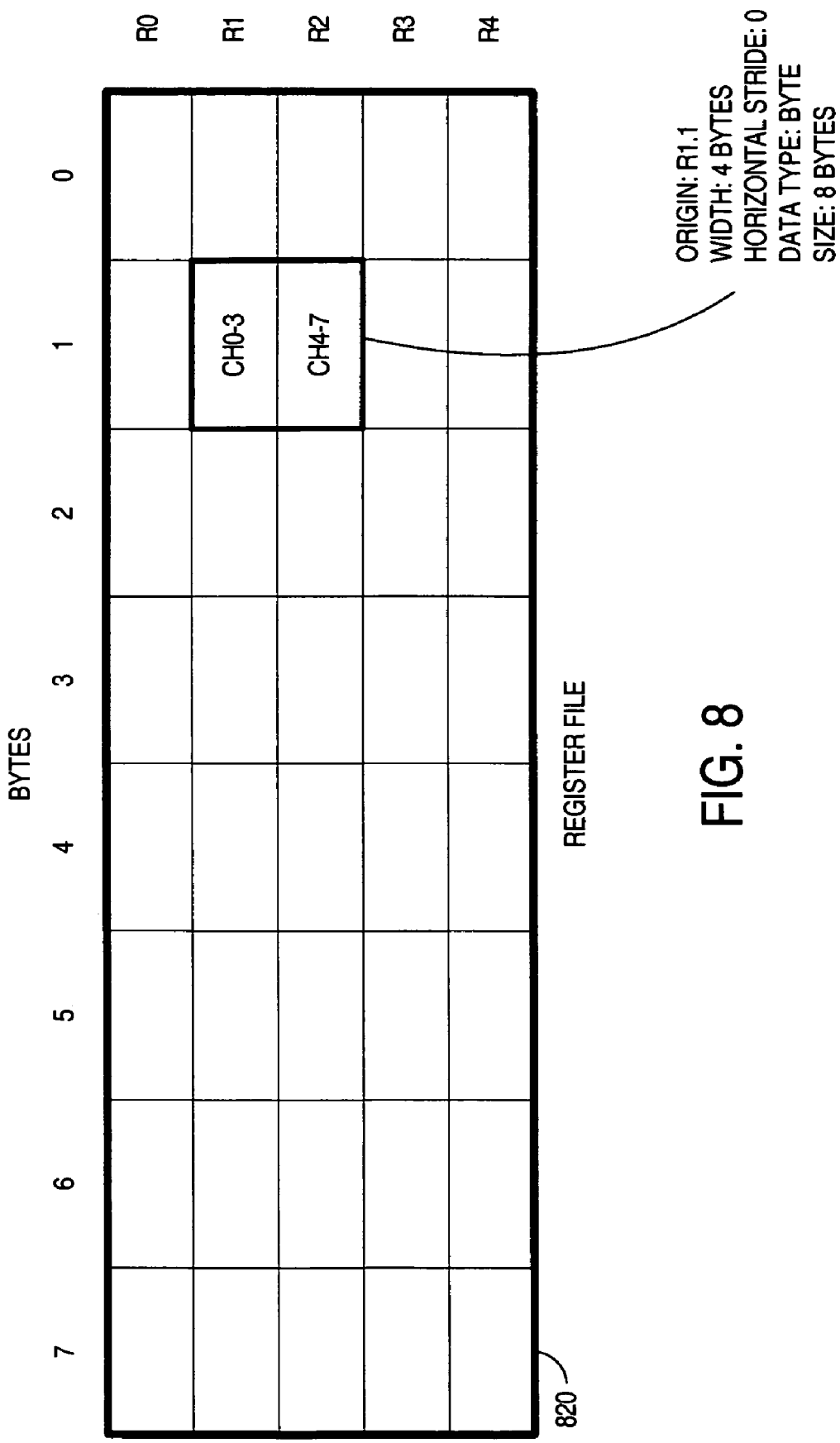
FIG. 8 illustrates a region description including a horizontal stride of zero according to some embodiments.

FIG. 8 illustrates a region description including a horizontal stride of "zero" according to some embodiments. As with FIG. 7, the region is for eight single-byte data elements and is four bytes wide (and therefore two data elements high). Because the horizontal stride is zero, however, each of the four elements in the first row map to the same physical location in the register file 820 (e.g., they are offset from their neighboring data element by zero). As a result, the value in R1.1 is replicated for the first four execution channels. When the region is associated with a source operand of an "add" instruction, for example, that same value would be used by all the first four execution channels. Similarly, the value in R2.1 is replicated for the last four execution channels.

According to some embodiments, the value of a horizontal stride may be encoded in an instruction. For example, a 3-bit field might be used to describe the following eight potential horizontal stride values: 0, 1, 2, 4, 8, 16, 32, and 64. Moreover, a negative horizontal stride may be described according to some embodiments.

Figure 9:
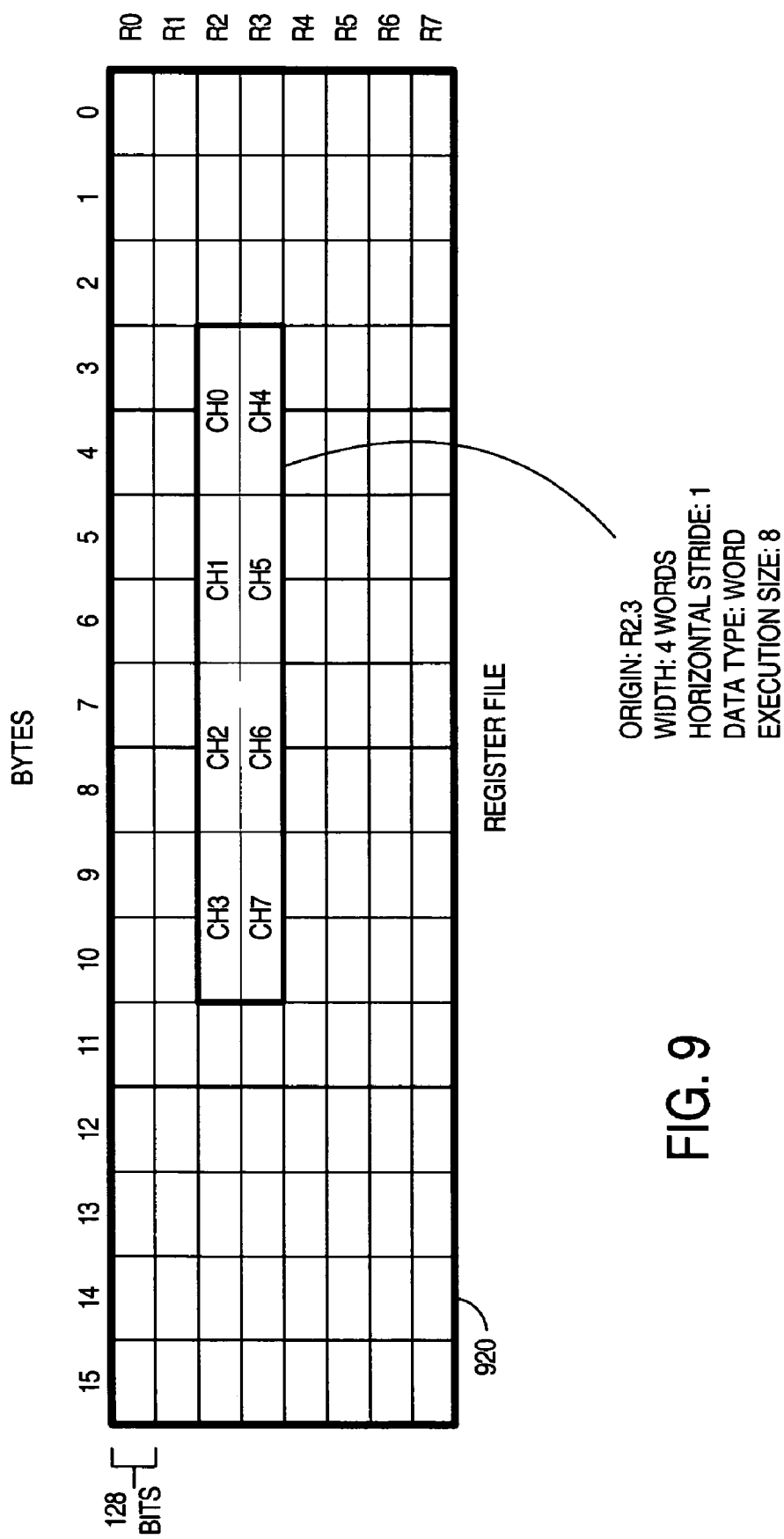
FIG. 9 illustrates a region description for word type data elements according to some embodiments.

Note that a region may be described for data elements of various sizes. For example, FIG. 9 illustrates a region description for word type data elements according to some embodiments. In this case, the register file 920 has eight sixteen-byte registers (R0 through R7, each having 128 bits), and the region begins at R2.3. The execution size is eight channels, and the width of the region is four data elements. Moreover, each data element is described as being one word (two bytes), and therefore the data element associated with the first execution channel (CH0) occupies both byte 3 and 4 of R2. Note that the horizontal stride of this region is one. In addition to byte and word type data elements, embodiments may be associated with other types of data elements (e.g., bit or float type elements).

Figure 10:
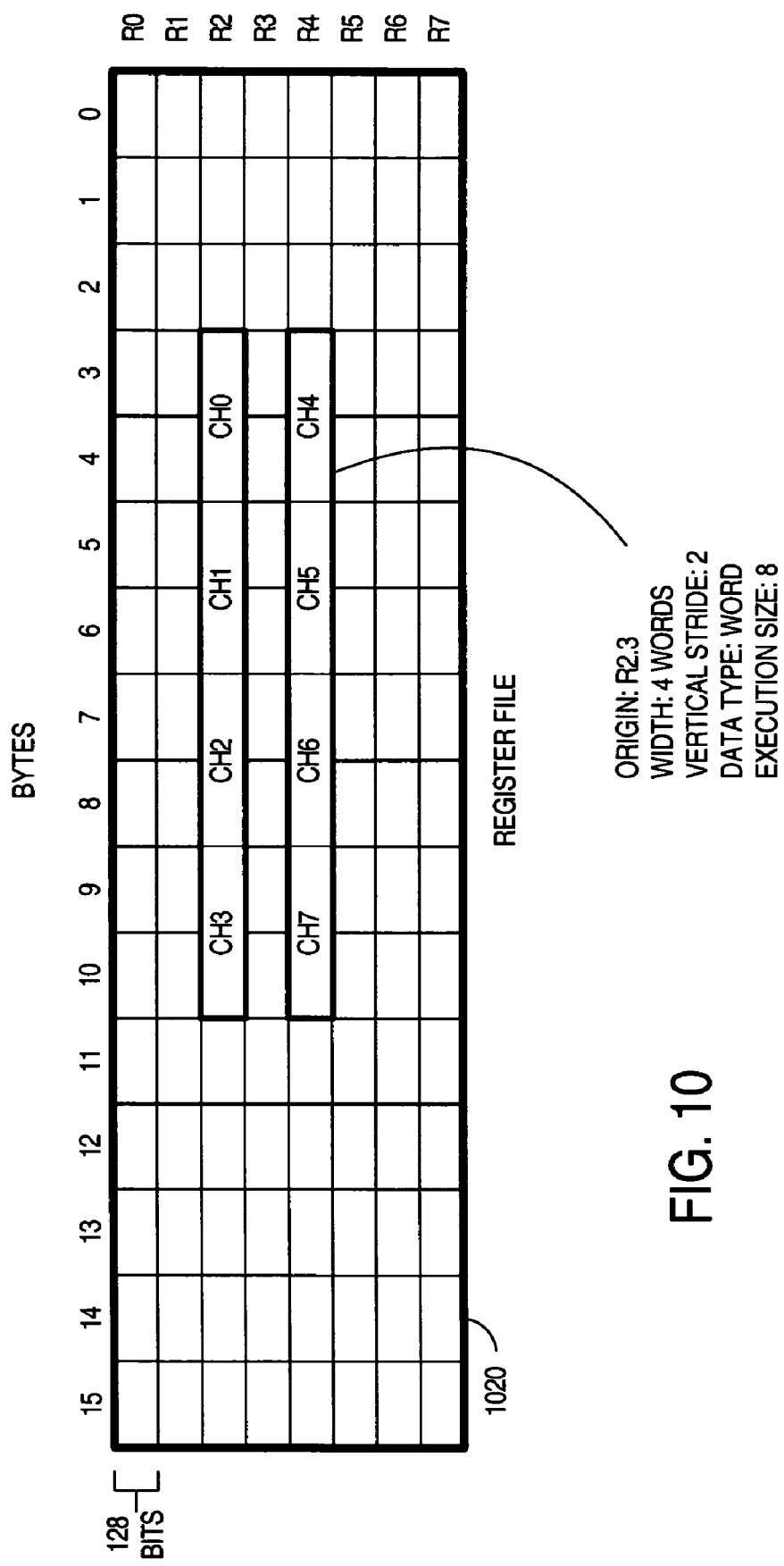
FIG. 10 illustrates a region description including a vertical stride according to some embodiments.

FIG. 10 illustrates a region description including a "vertical stride" according to some embodiments. The vertical stride might, for example, indicate a row offset between rows of data elements in a register file 1020. As in FIG. 9, the register file 1020 has eight sixteen-byte registers (R0 through R7), and the region begins at R2.3. The execution size is eight channels, and the width of the region is four single word data elements (implying a row height of two for the region). In this case, however, a vertical stride of two has been described. As a result, each data element in a column is offset from its neighboring data element in that column by two registers. For example, the data element associated with channel 3 of the execution engine is located at bytes 9 and 10 of R2 and the data element associated with channel 7 is located at bytes 9 and 10 of R4. As with the horizontal stride, the described region is not contiguous in the register file 1020. Note that when a vertical stride of one is described, the result would be a contiguous 4×2 array of words beginning at R2.3 in the two dimensional map of the register file 1020.

The region described in FIG. 10 might be associated with a source operand, in which case data may be gathered from the non-contiguous areas when an instruction is executed. The region described in FIG. 10 might also be associated with a destination operand, in which case results may be scattered to the non-contiguous areas when an instruction is executed. According to some embodiments, a vertical stride might be described as data element column offset betweens rows of data elements (e.g., as described with respect to FIG. 14). Also note that a vertical stride might be less than, greater than, or equal to a horizontal stride.

Figure 11:
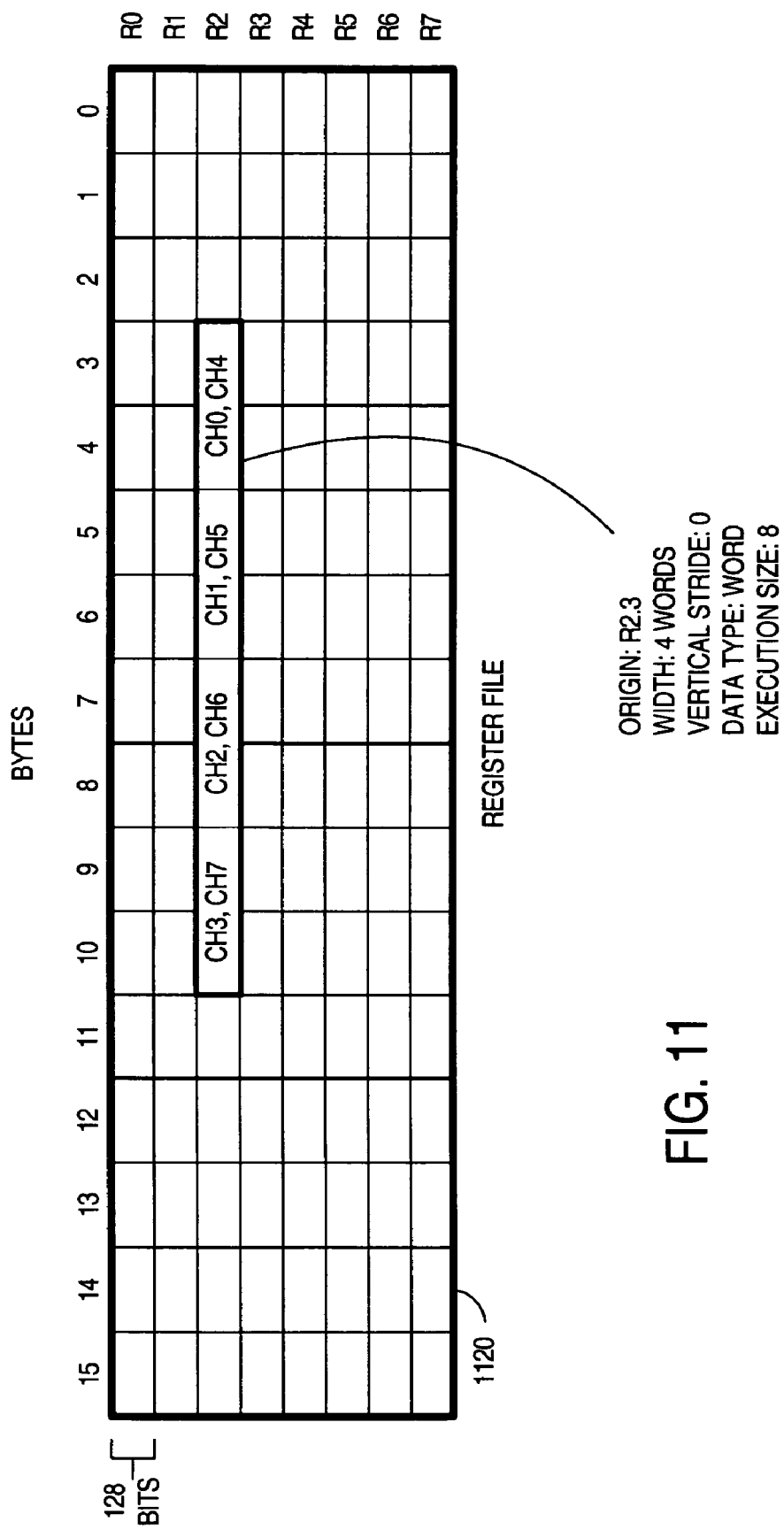
FIG. 11 illustrates a region description including a vertical stride of zero according to some embodiments.

FIG. 11 illustrates a region description including a vertical stride of "zero" according to some embodiments. As with FIGS. 9 and 10, the region is for eight single-word data elements and is four words wide (and therefore two data elements high). Because the vertical stride is zero, however, both of the elements in the first column map to the same location in the register file 1120 (e.g., they are offset from each other by zero). As a result, the word at bytes 3-4 of R2 is replicated for those two execution channels (e.g., channels 0 and 4). When the region is associated with a source operand of a "compare" instruction, for example, that same value would be used by both execution channels. Similarly, the word at bytes 5-6 of R2 is replicated for the channels 1 and 5 of the SIMD execution engine, etc. In addition, the value of a vertical stride may be encoded in an instruction, and, according to some embodiments, a negative vertical stride may be described.

Figure 12:
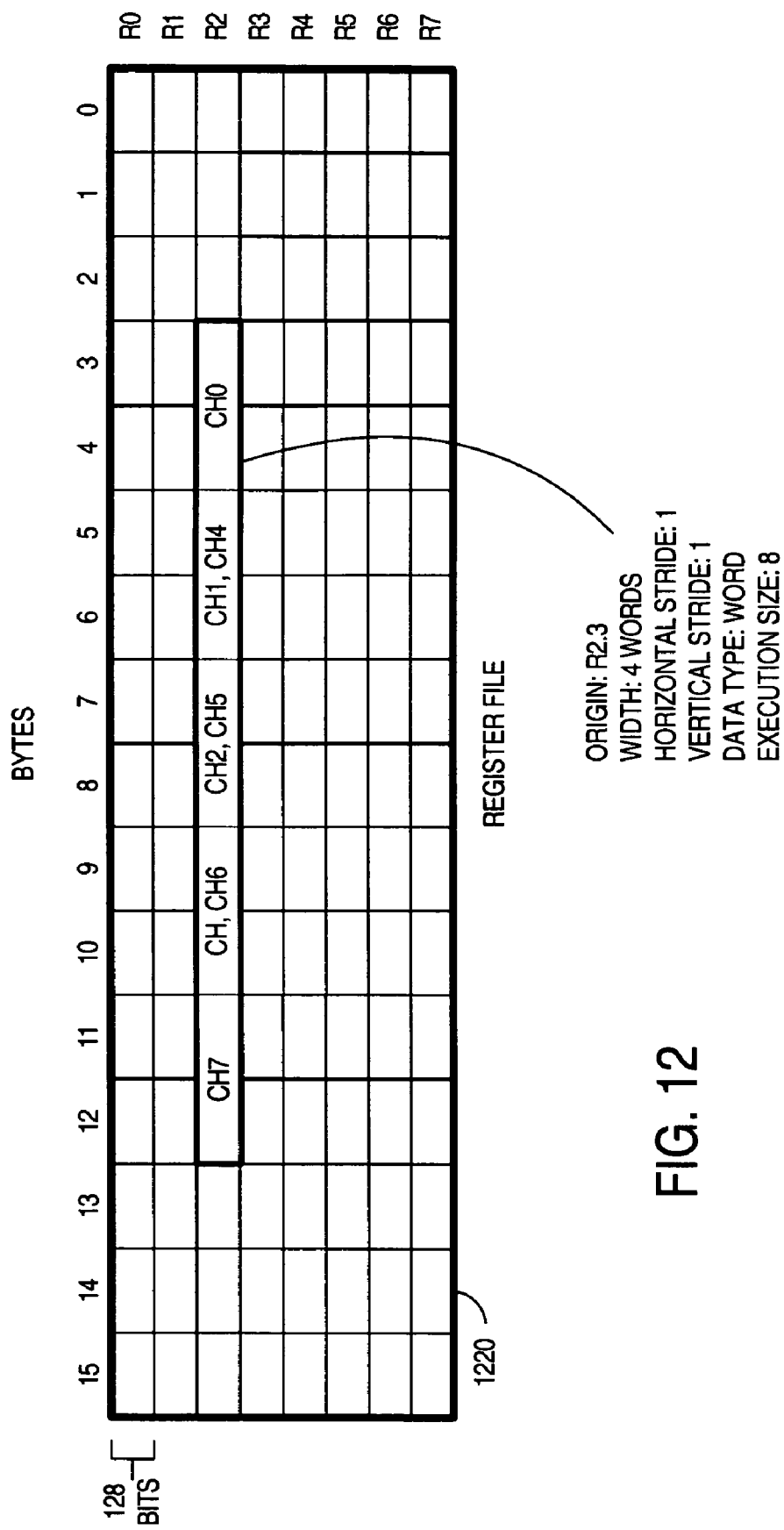
FIG. 12 illustrates a region description according to some embodiments.

According to some embodiments, a vertical stride might be defined as a number of data elements in a register file 1220 (instead of a number of register rows). For example, FIG. 12 illustrates a region description having a 1-data element (1-word) vertical stride according to some embodiments. Thus, the first "row" of the array defined by the region comprises four words from R2.3 through R2.10. The second row is offset by a single word and spans from R2.5 through R2.12. Such an implementation might be associated with, for example, a sliding window for a filtering operation.

Figure 13:
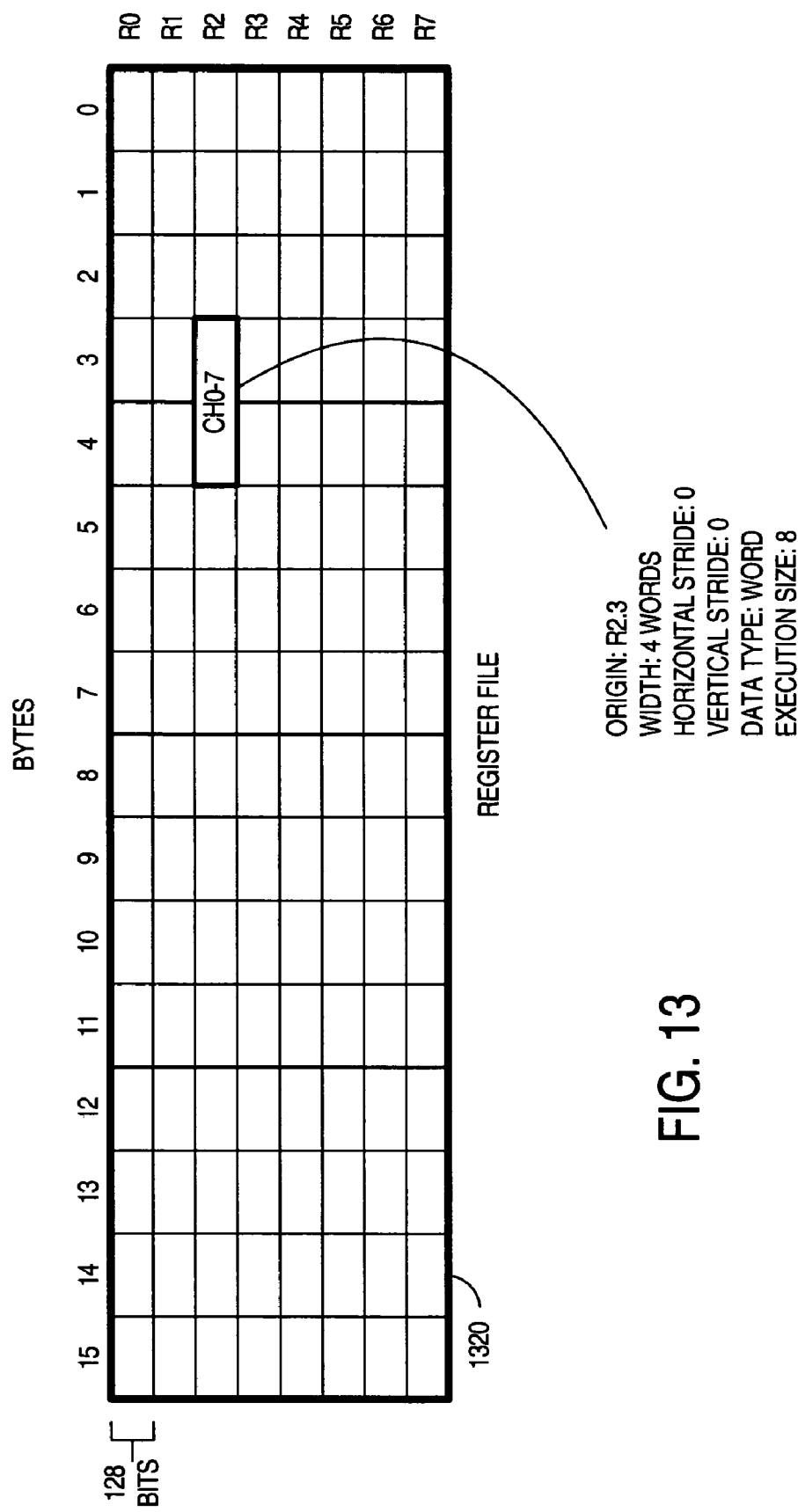
FIG. 13 illustrates a region description wherein both the horizontal and vertical strides are zero according to some embodiments.

FIG. 13 illustrates a region description wherein both the horizontal and vertical strides are zero according to some embodiments. As a result, all eight execution channels are mapped to a single location in the register file 1320 (e.g., bytes 3-4 of R2). When the region is associated with a machine code instruction, therefore, the single value at bytes 3-4 of R2 may be used by all eight of the execution channels.

Note that different types of descriptions may be provided for different instructions. For example, a first instruction might define a destination region as a 4×4 array while the next instruction defines a region as a 1×16 array. Moreover, different types of regions may be described for a single instruction.

Figure 14:
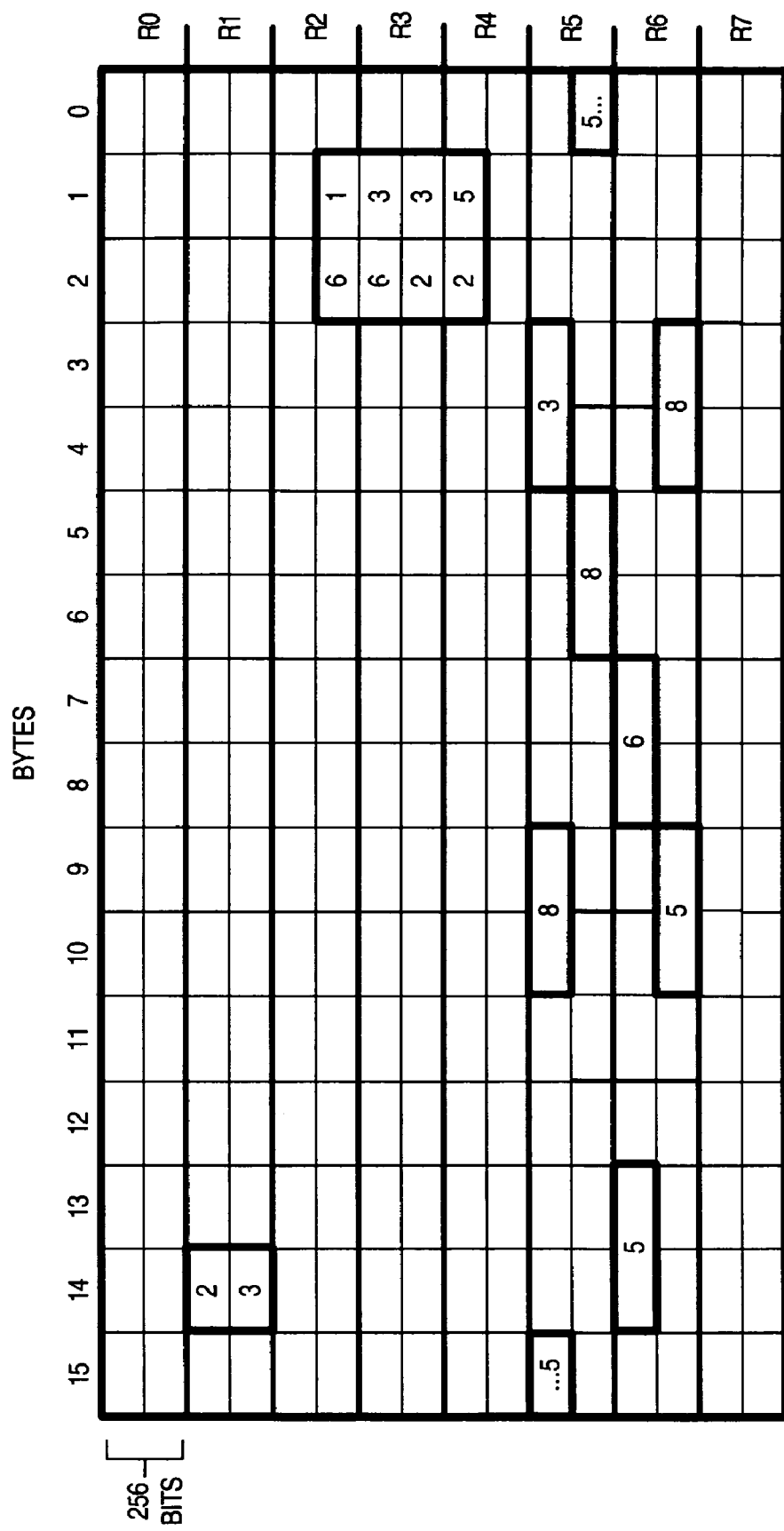
FIG. 14 illustrates region descriptions according to some embodiments.

Consider, for example, the register file 1420 illustrated in FIG. 14 having eight thirty-two-byte registers (R0 through R7, each having 256 bits). Note that in this illustration, each register is shown as being two "rows" and sample values are shown in each location of a region.

In this example, regions are described for an operand within an instruction as follows:

RegFile RegNum.SubRegNum<VertStride; Width, HorzStride>:type where RegFile identifies the name space for the register file 1420, RegNum points a register in the register file 1420 (e.g., R0 through R7), SubRegNum is a byte-offset from the beginning of that register, VertStride describes a vertical stride, Width describes the width of the region, HorzStride describes a horizontal stride, and type indicates the size of each data element (e.g., "b" for byte-size and "w" for word-size data elements). According to some embodiments, SubRegNum may be described as a number of data elements (instead of a number of bytes). Similarly, VertStride, Width, and HorzStride could be described as a number of bytes (instead of a number of data elements).

FIG. 14 illustrates a machine code add instruction being executed by eight channels of a SIMD execution engine. In particular, each of the eight bytes described by R2.17<16; 2,1>b (SRC1) are added to each of the eight bytes described by R1.14<16;4,0>:b (SRC0). The eight results are stored in each of the eight words described by R5.3<18;4,3>:w (DEST).

SRC1 is two bytes wide, and therefore four data elements high, and begins in byte 17 of R2 (illustrated in FIG. 14 as the second byte of the second row of R2). The horizontal stride is one. In this case, the vertical stride is described as a number of data element columns separating one row of the region from a neighboring row (as opposed to a row offset between rows as discussed with respect to FIG. 10). That is, the start of one row is offset from the start of the next row of the region by 16 bytes. In particular, the first row starts at R2.17 and the second row of the region starts at R3.1 (counting from right-to-left starting at R2.17 and wrapping to the next register when the end of R2 is reached). Similarly, the third row starts at R3.17.

SRC0 is four bytes wide, and therefore two data elements high, and begins at R1.14. Because the horizontal stride is zero, the value at location R1.14 (e.g., "2" as illustrated in FIG. 14) maps to the first four execution channels and value at location R1.30 (based on the vertical stride of 16) maps to the next four execution channels.

DEST is four words wide, and therefore two data elements high, and begins at R5.3. Thus, the execution channel will add the value "1" (the first data element of the SRC0 region) to the value "2" (the data element of the SRC1 region that will be used by the first four execution channels) and the result "3" is stored into bytes 3 and 4 of R5 (the first word-size data element of the DEST region).

The horizontal stride of DEST is three data elements, so the next data element is the word beginning at byte 9 of R5 (e.g., offset from byte 3 by three words), the element after that begins at bye 15 of R5 (shown broken across two rows in FIG. 14), and the last element in the first row of the DEST region starts at byte 21 of R5.

The vertical stride of DEST is eighteen data elements, so the first data element of the second "row" of the DEST array begins at byte 7 of R6. The result stored in this DEST location is "6" representing the "3" from the fifth data element of SRC0 region added to the "3" from the SRC1 region which applies to execution channels 4 through 7.

Because information in the register files may be efficiently and flexibly accessed in different ways, the performance of a system may be improved. For example, machine code instructions may efficiently be used in connection with a replicated scalar, a vector of a replicated scalar, a replicated vector, a two-dimensional array, a sliding window, and/or a related list of one-dimensional arrays. As a result, the amount of data moves, packing, unpacking, and or shuffling instructions may be reduced—which can improve the performance of an application or algorithm, such as one associated with a media kernel.

Note that in some cases, restrictions might be placed on region descriptions. For example, a sub-register origin and/or a vertical stride might be permitted for source operands but not destination operands. Moreover, physical characteristics of a register file might limit region descriptions. For example, a relatively large register file might be implemented using embedded Random Access Memory (RAM), and the cost and power associated with the embedded RAM might depended on the number of read and write ports that are provided. Thus, the number of read and write points (and the arrangement of the registers in the RAM) might restrict region descriptions.

Figure 15:
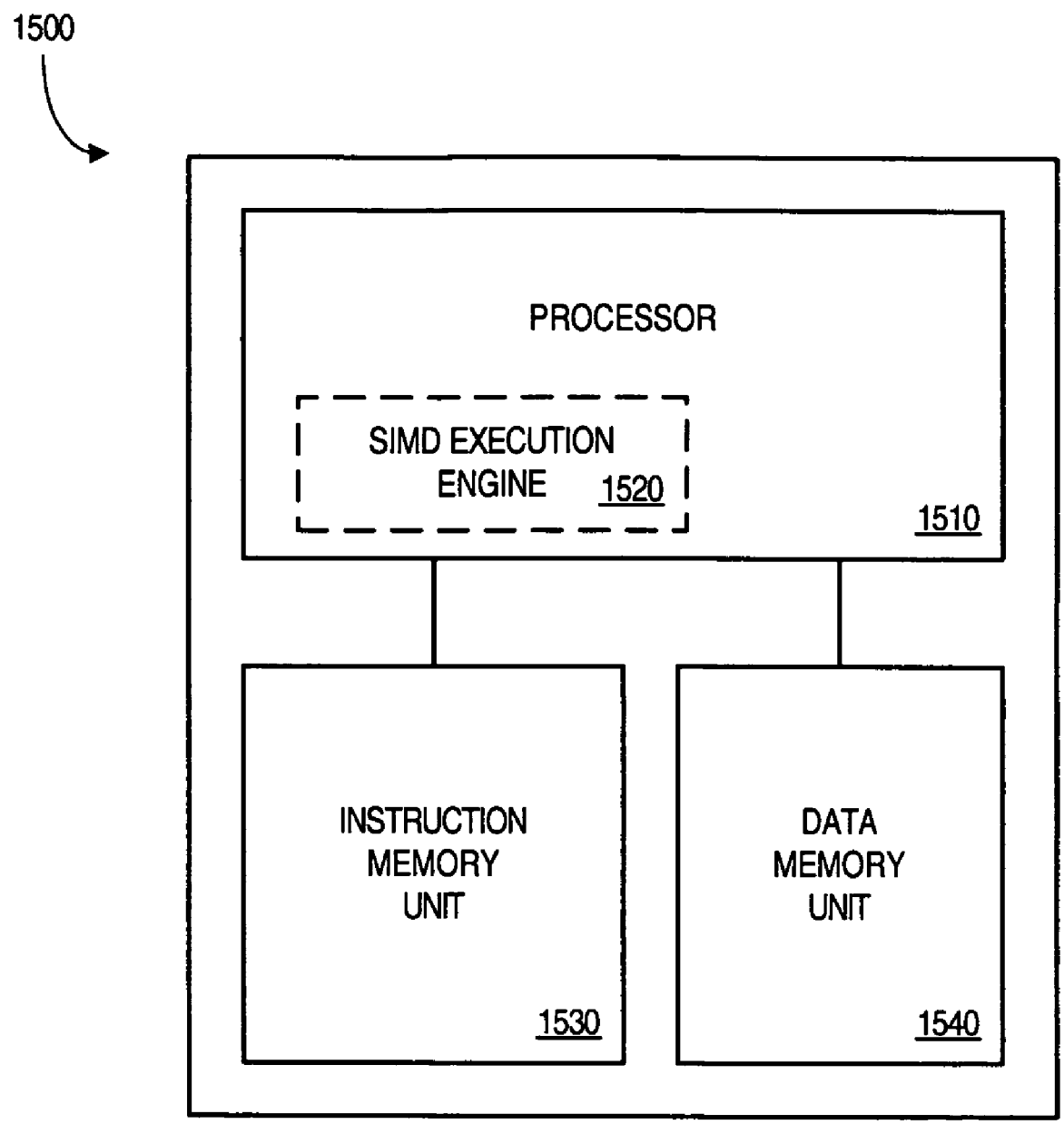
FIG. 15 is a block diagram of a system according to some embodiments.

FIG. 15 is a block diagram of a system 1500 according to some embodiments. The system 1500 might be associated with, for example, a media processor adapted to record and/or display digital television signals. The system 1500 includes a processor 1510 that has an n-operand SIMD execution engine 1520 in accordance with any of the embodiments described herein. For example, the SIMD execution engine 1520 might include a register file and an instruction mapping engine to map operands to a dynamic region of the register file defined by an instruction. The processor 1510 may be associated with, for example, a general purpose processor, a digital signal processor, a media processor, a graphics processor, or a communication processor.

The system 1500 may also include an instruction memory unit 1530 to store SIMD instructions and a data memory unit 1540 to store data (e.g., scalars and vectors associated with a two-dimensional image, a three-dimensional image, and/or a moving image). The instruction memory unit 1530 and the data memory unit 1540 may comprise, for example, RAM units. Note that the instruction memory unit 1530 and/or the data memory unit 1540 might be associated with separate instruction and data caches, a shared instruction and data cache, separate instruction and data caches backed by a common shared cache, or any other cache hierarchy. According to some embodiments, the system 1500 also includes a hard disk drive (e.g., to store and provide media information) and/or a non-volatile memory such as FLASH memory (e.g., to store and provide instructions and data).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although various ways of describing source and/or destination operands have been discussed, note that embodiments may be use any subset or combination of such descriptions. For example, a source operand might be permitted to have a vertical stride while a vertical stride might not be permitted for a destination operand.

Note that embodiments may be implemented in any of a number of different ways. For example, the following code might compute the addresses of data elements assigned to execution channels when the destination register is aligned to a 256-bit register boundary:

```
// Input:       Type: b | ub | w | uw | d | ud | f
//              RegNum: In unit of 256-bit register
//              SubRegNum: In unit of data element size
//              ExecSize, Width, VertStride, HorzStride:
//                  In unit of data elements
// Output:      Address[0:ExecSize-1] for execution channels
int ElementSize = (Type=="b"||Type=="ub") ? 1 :
(Type=="w"||Type=="uw") ? 2 : 4;
int Height = ExecSize / Width;
int Channel = 0;
int RowBase = RegNum<<5 + SubRegNum * ElementSize;
for (int y=0; y<Height; y++) {
    int Offset = RowBase;
    for (int x=0; x<Width; x++) {
        Address [Channel++] = Offset;
```

```
        Offset += HorzStride*ElementSize;
    }
    RowBase += VertStride * ElementSize;
}
```

According to some embodiments, a register region is encoded in an instruction word for each of the instruction's operands. For example, the register number and sub-register number of the origin may be encoded. In some cases, the value in the instruction word may represent a different value in terms of the actual description. For example, three bits might be used to encode the width of a region, and "011" might represent a width of eight elements while "100" represents a width of sixteen elements. In this way, a larger range of descriptions may be available as compared to simply encoding the actual value of the description in the instruction word.

Moreover, some embodiments have been described herein with respect to a SIMD execution engine. Note, however, that embodiments may be associated with other types of execution engines, such as a Multiple Instruction, Multiple Data (MIMD) execution engine.

The several embodiments described herein are solely for the purpose of illustration. Persons skilled in the art will recognize from this description other embodiments may be practiced with modifications and alterations limited only by the claims.

What is claimed is:

1. A method, comprising:
defining, for an operand, an origin comprising a register identifier and a sub-register identifier of a dynamic region in a register file comprising a plurality of bytes, wherein the dynamic region is to store multiple data elements, each data element being associated with an execution channel of an execution engine; and
storing information into or retrieving information from the register file in accordance with the dynamic region, wherein the sub-register identifier indicates an offset from a start of a register and wherein the offset is to point to any of the plurality of bytes.

2. The method of claim 1, wherein the defined origin and the offset are included in a single instruction, multiple data machine code instruction.

3. The method of claim 1, wherein the operand is one of a source operand or a destination operand.

4. The method of claim 1, further comprising:
defining multiple dynamic regions for multiple operands.

5. The method of claim 1, wherein the defined dynamic region spans different registers in the register file.

6. The method of claim 1, wherein the defined dynamic region is not contiguous in the register file.

7. The method of claim 1, wherein the defined dynamic region is not aligned to registers in the register file.

8. The method of claim 1, wherein the register file includes register rows and register columns.

9. The method of claim 8, wherein data elements are arranged within the defined region in one of: (i) row-major order, or (ii) column-major order.

10. The method of claim 8, wherein said defining includes a width indicating a number of data elements associated with the defined region within a register row.

11. The method of claim 8, wherein said defining includes a horizontal stride indicating an offset between columns of data elements in the register file.

12. The method of claim 8, wherein said defining includes a vertical stride indicating at least one of: (i) a row offset between rows of data elements in the register file or (ii) a data element offset between rows of data elements in the register file.

13. The method of claim 1, wherein said defining includes a data type indicating a size of each data element.

14. The method of claim 1, wherein said defining includes an execution size indicating a number of data elements associated with the defined region.

15. The method of claim 1, wherein the defined region is associated with at least one of: (i) replicated scalar, (ii) a vector of a replicated scalar, (iii) a replicated vector, (iv) a two-dimensional array, (v) a sliding window, or (vi) a related list of one-dimensional arrays.

16. An apparatus, comprising:
a single instruction, multiple data execution engine;
a register file on the same die as the execution engine; and
an instruction mapping engine to define, for an operand, an origin comprising a register identifier and a sub-register identifier of a dynamic region in a register file comprising a plurality of bytes, wherein the dynamic region is to store multiple data elements, each data element being associated with an execution channel of an execution engine, and is to store information into or is to retrieve information from the register file in accordance with the dynamic region, wherein the sub-register identifier indicates an offset from a start of a register and wherein the offset is to point to any of the plurality of bytes.

17. The apparatus of claim 16, wherein the defined region spans different registers in the register file.

18. The apparatus of claim 16, wherein the defined region is not contiguous in the register file.

19. The apparatus of claim 16, wherein the register file includes register rows and register columns, and the instruction mapping engine defines the portion based on a description including, (i) a width, and (ii) a horizontal stride.

20. A system, comprising:
an n-channel single instruction, multiple-data execution engine, n being an integer greater than 1;
a register file; and
an instruction mapping engine to define, for an operand, an origin comprising a register identifier and a sub-register identifier of a dynamic region in a register file comprising a plurality of bytes, wherein the dynamic region is to store multiple data elements, each data element being associated with an execution channel of an execution engine, and is to store information into or is to retrieve information from the register file in accordance with the dynamic region, wherein the sub-register identifier indicates an offset from a start of a register and wherein the offset is to point to any of the plurality of bytes; and
a graphics data memory unit.

21. The system of claim 19, wherein the instruction mapping engine scatters data to areas of the register file.

22. The system of claim 21, wherein the areas are non-contiguous in the register file.

23. The system of claim 19, wherein the instruction mapping engine gathers data from areas of the register file.

24. The system of claim 23, wherein the areas are non-contiguous in the register file.

* * * * *